G. C. HENERLAU.
DENTAL FLOSS HOLDER.
APPLICATION FILED JUNE 15, 1920.

1,368,555.

Patented Feb. 15, 1921.

INVENTOR
George C. Henerlau,
BY
Wm H Canfield
ATTORNEY

UNITED STATES PATENT OFFICE.

GEORGE C. HENERLAU, OF NEWARK, NEW JERSEY.

DENTAL-FLOSS HOLDER.

1,368,555.　　　　　　　Specification of Letters Patent.　　Patented Feb. 15, 1921.

Application filed June 15, 1920. Serial No. 389,081.

*To all whom it may concern:*

Be it known that I, GEORGE C. HENERLAU, a citizen of the United States, and a resident of Newark, county of Essex, and State of New Jersey, have invented certain new and useful Improvements in Dental-Floss Holders, of which the following is a specification.

This invention relates to an improved holder for dental floss in which the handle acts as a holder for a spool of floss and which is equipped with arms that are adapted to hold a strand of said floss at a material distance transversely from said handle so that said strand can be easily passed between the teeth.

The invention further consists in certain details of construction, as will be more fully set forth hereinafter and finally embodied in the claims.

Figure 1:
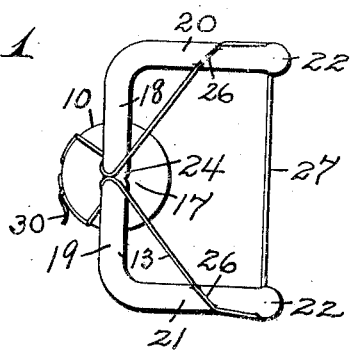
Figure 4:
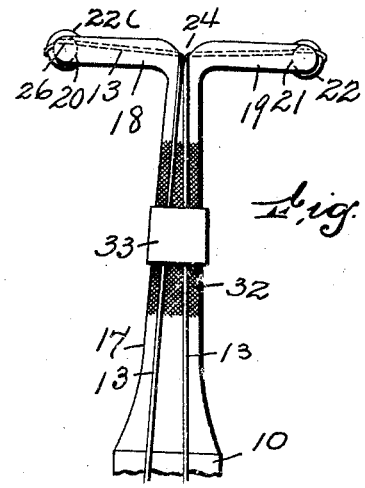
Figure 2:
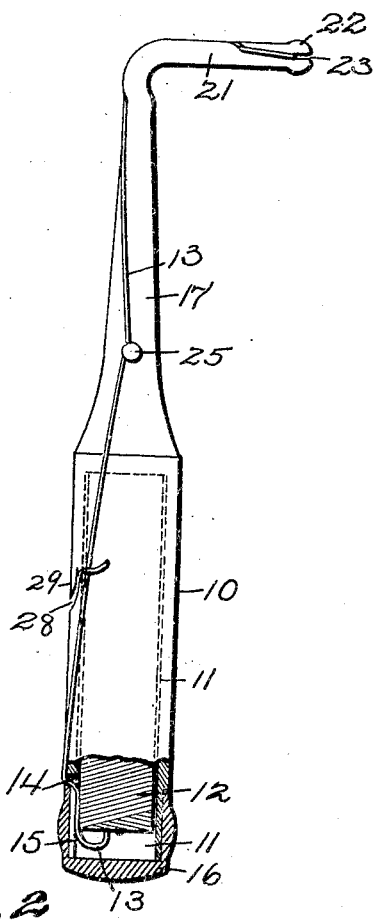
Figure 3:
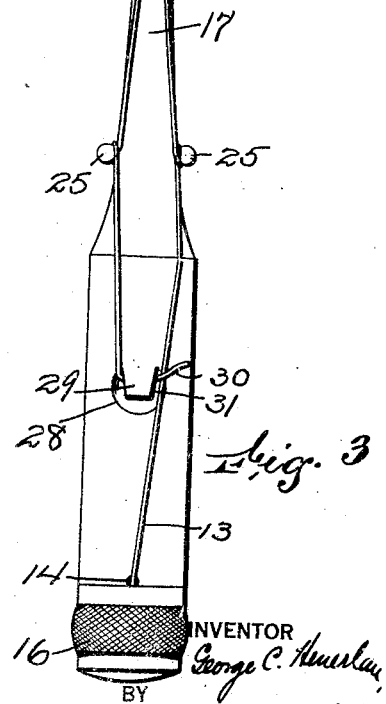

The invention is illustrated in the accompanying drawing, in which Figure 1 is a top view of one form of my improved dental floss holder. Fig. 2 is a side view thereof with the bottom part broken away. Fig. 3 is a back view of the device shown in Figs. 1 and 2, and Fig. 4 is a similar view of the upper part thereof, but showing a modified form of construction.

The device comprises a handle 10 which includes a means for holding a spool of floss, the preferred form being by providing a socket 11 in the bottom of the handle and extending substantially its full length, into which a spool 12 of floss is adapted to be seated, a strand of the floss, as at 13, being preferably pulled from the inside of the spool, as is commonly done, and passed out through the upper end 14 of a slot 15 in the side of the open end of the handle, a cap 16 being slid on and held by friction or by other means, the cap, however, being shorter than the length of the slot 15 so that the end 14 is not covered and the strand 13 can pass from the handle when the cap is in place.

On the top of the handle is an extension 17 which is in the form of a stem, preferably tapered toward its upper end, and is provided at the top with arms 18 and 19, which extend substantially in line but in opposite directions and have their respective ends 20 and 21 extending to the front, these being substantially parallel and approximately at right angles to the axis of the stem 17. The extremities of the ends 20 and 21 are enlarged, as at 22, this being done to provide a smooth surface so that when the device is in the mouth there is no chance of any sharp edges causing discomfort or injury to the tender membrane in the mouth.

These extremities are provided with saw cuts 23, these saw cuts being horizontal and substantially in line. Where the arms 18 and 19 are joined to the stem 17 there is a depression 24 which forms shoulders on each side thereof.

The strand is held on the device so that it lies substantially close thereto, that is, does not extend beyond the general conformation of the device, and in order to hold the strand close to said stem I provide means such as the knobs 25 which have a contracted portion adjacent to the stem, so that a strand wound around the knobs will be well seated in this contracted portion and held by friction therein against dislodgment under normal strain.

The strand usually is passed out of the opening 14 and then around one of the knobs, in the drawing this being the knob to the right looking at Fig. 3, then through the depression 24 and over to the outside of the extremity of the end 21, and to provide for an additional seating and holding of said strand I may provide saw cuts 26 which extend in the direction of the depression 24. The strand is passed through the saw cut in the end 21, then through the saw cut 23 in the extremity of the end 21, then straight across to the saw cut in the extremity of the arm 20. This part that extends straight across, identified by the numeral 27, is the part that is used in the operation of the device in cleaning between the teeth. The strand then passes through the saw cut in the end 20 and back through the depression 24, then over the other knob 25. I may fasten the end of the strand substantially close to the handle by suitable means, the form shown consisting of a depressed part 28 having a lip 29 extending over the depression, this lip having a slight spring action, so that the end 30 of the strand, when caught under this lip, is securely held in position. If desired, an edge, such as the edge 31, or both edges if need be, can be sharpened to provide knife edges on which the strand can be severed.

It will be evident from this description that when the part 27 of the strand is to be replaced, the strand is quickly unwound, an additional length pulled out through the hole 14, the strand re-threaded on the holder, the excess cut off on the knife edge 31, and the device is again ready for use.

In Fig. 4 I show a modification in which the stem is roughened, as at 32, and tapered, and a sleeve 33 can be slid down on said tapered portion to tightly bind the parts of the strand extending from the handle to the depression 24 in place, thus holding the strand taut and also holding it close to the stem so that there are no projecting portions of the strand, nor parts of the strand, that bridge from one point to another that are adapted to be grasped by the hand in using the device, stretched and then left slack when released.

The position of the arms is advantageous, especially with the ends 20 and 21 projecting substantially at right angles from the arms 18 and 19 so that a substantially flat or straight side of the arms engages the cheek or other parts of the mouth and not a projecting or obliquely inclined pointed support. Such spreading also provides for an ample length of usable strand 27.

It will be evident that changes can be made in the details of the device, or in the assembling of the parts, without departing from the scope of the invention.

I claim:

1. A dental floss holder comprising a handle having means for holding a spool of dental floss, a stem in extension of the handle, arms on the end of the stem, the arms extending in opposite directions from the stem with their ends formed to extend substantially parallel with each other and at right angles to the oppositely arranged parts, the extremities of the arms having saw cuts therein, a strand of floss being passed from the spool along the stem and in the saw cuts of the extremities, and means for holding said strand close to said stem, said means permitting the ready removal of said strand.

2. A dental floss holder comprising a handle having means for holding a spool of dental floss, a stem in extension of said handle, arms extending in opposite directions from the end of the stem and having a depression forming shoulders where the arms meet, the ends of the arms extending substantially parallel to each other and at right angles to the axis of the stem, the extremities of the arms having alined saw cuts, the spool-holding means being positioned to feed a strand from the rear of the handle, whereby the strand can be passed between the shoulders, through the saw cuts and back between the shoulders, and means for holding the strand below the shoulders taut and close to said stem.

3. A dental floss holder comprising a handle having a socket in its bottom end for receiving a spool of dental floss and having an opening in the back through which a strand from the spool can be fed, a stem in extension of the handle, arms extending in opposite directions from the top of the stem and having a depression where the arms meet, the ends of the arms being bent forward and substantially parallel and having saw cuts in their extremities, inclined saw cuts in the tops of said ends and extending from the outer edges of said ends toward the depression in the arms, whereby a strand of floss can be led from the opening in the handle and through the depression, then through the saw cuts, back through the depression, and means for holding the end of said strand close to said stem and taut.

4. A dental floss holder comprising a handle having a socket in its bottom end for receiving a spool of dental floss and having an opening in the back through which a strand from the spool can be fed, a stem in extension of the handle, arms extending in opposite directions from the top of the stem and having a depression where the arms meet, the ends of the arms being bent forward and substantially parallel and having saw cuts in their extremities, inclined saw cuts in the tops of said ends and extending from the outer edges of said ends toward the depression in the arms, whereby a strand of floss can be led from the opening in the handle and through the depression, then through the saw cuts, back through the depression, and knobs extending from opposite sides of the stem around which the strand is adapted to be passed so as to hold said strand taut and close to the stem.

In testimony that I claim the foregoing, I have hereto set my hand, this 14th day of June, 1920.

GEORGE C. HENERLAU.